US009742764B1

(12) United States Patent
Ziraknejad et al.

(10) Patent No.: US 9,742,764 B1
(45) Date of Patent: Aug. 22, 2017

(54) PERFORMING BIOMETRICS IN UNCONTROLLED ENVIRONMENTS

(71) Applicant: MicroStrategy Incorporated, Vienna, VA (US)

(72) Inventors: Siamak Ziraknejad, Reston, VA (US); Ren-Jay Huang, Leesburg, VA (US); Burak Sahin, Arlington, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 15/232,350

(22) Filed: Aug. 9, 2016

Related U.S. Application Data

(63) Continuation of application No. 14/603,611, filed on Jan. 23, 2015, now Pat. No. 9,430,629.

(60) Provisional application No. 61/931,311, filed on Jan. 24, 2014.

(51) Int. Cl.
| | |
|---|---|
| *H04L 9/00* | (2006.01) |
| *H04L 29/06* | (2006.01) |
| *G06F 21/32* | (2013.01) |
| *G06F 17/30* | (2006.01) |
| *G06K 9/00* | (2006.01) |

(52) U.S. Cl.
CPC ...... *H04L 63/0861* (2013.01); *G06F 17/3028* (2013.01); *G06F 17/30247* (2013.01); *G06F 21/32* (2013.01); *G06K 9/00006* (2013.01); *G06K 9/00154* (2013.01); *G06K 9/00221* (2013.01); *G06K 9/00597* (2013.01)

(58) Field of Classification Search
CPC ............ H04L 63/0861; G06K 9/00221; G06K 9/00154; G06K 9/00597; G06K 9/00006; G06F 17/30247; G06F 17/3028
See application file for complete search history.

(56) References Cited

U.S. PATENT DOCUMENTS

| | | | |
|---|---|---|---|
| 8,260,009 B2 | 9/2012 | Du | |
| 8,798,336 B2 | 8/2014 | Nechyba | |
| 2003/0046237 A1 | 3/2003 | Uberti | |
| 2006/0110011 A1 | 5/2006 | Cohen | |
| 2010/0162386 A1* | 6/2010 | Li | G06F 21/32 726/19 |
| 2010/0228692 A1 | 9/2010 | Guralnik | |
| 2011/0311111 A1 | 12/2011 | Allburn | |
| 2015/0033305 A1 | 1/2015 | Shear | |

OTHER PUBLICATIONS

Emanuela Marasco et al., "Combining Match Scores with Liveness Values in a Fingerprint Verification System", Proc. of 5th IEEE International Conference on Biometrics: Theory Applications and Systems (BTAS), Washington, DC, Sep. 2012, 8 pages.

(Continued)

*Primary Examiner* — Beemnet Dada
(74) *Attorney, Agent, or Firm* — Fish & Richardson P.C.

(57) ABSTRACT

Methods, systems, and apparatus, including computer programs encoded on a computer storage medium, for receiving an enrollment biometric identifier of a user. Determining a matching threshold based on a characteristic of the enrollment biometric identifier of the user. Storing the matching threshold in an enrollment profile for the use in association with the enrollment biometric identifier.

18 Claims, 8 Drawing Sheets

(56) References Cited

OTHER PUBLICATIONS

Karthik Nandakumar, "Likelihood Ratio-Based Biometric Score Fusion", IEEE Transactions on Pattern Analysis and Machine Intelligence, vol. 30, No. 2, Feb. 2008, pp. 342-347.
L. Latha et al., "Efficient approach to Normalization of Multimodal Biometric Scores", International Journal of Computer Applications (0975-8887), vol. 32—No. 10, Oct. 2011, pp. 57-64.
Arun Ross et al., "Information fusion in biometrics", Pattern Recognition Letters 24 (2003) 2115-2125.
Arun Ross et al., "Exploiting the "Doddington Zoo" Effect in Biometric Fusion", Proc. of 3rd IEEE International Conference on Biometrics: Theory, Applications and Systems (BTAS), (Washington DC, USA), Sep. 2009, 7 total pages.

\* cited by examiner

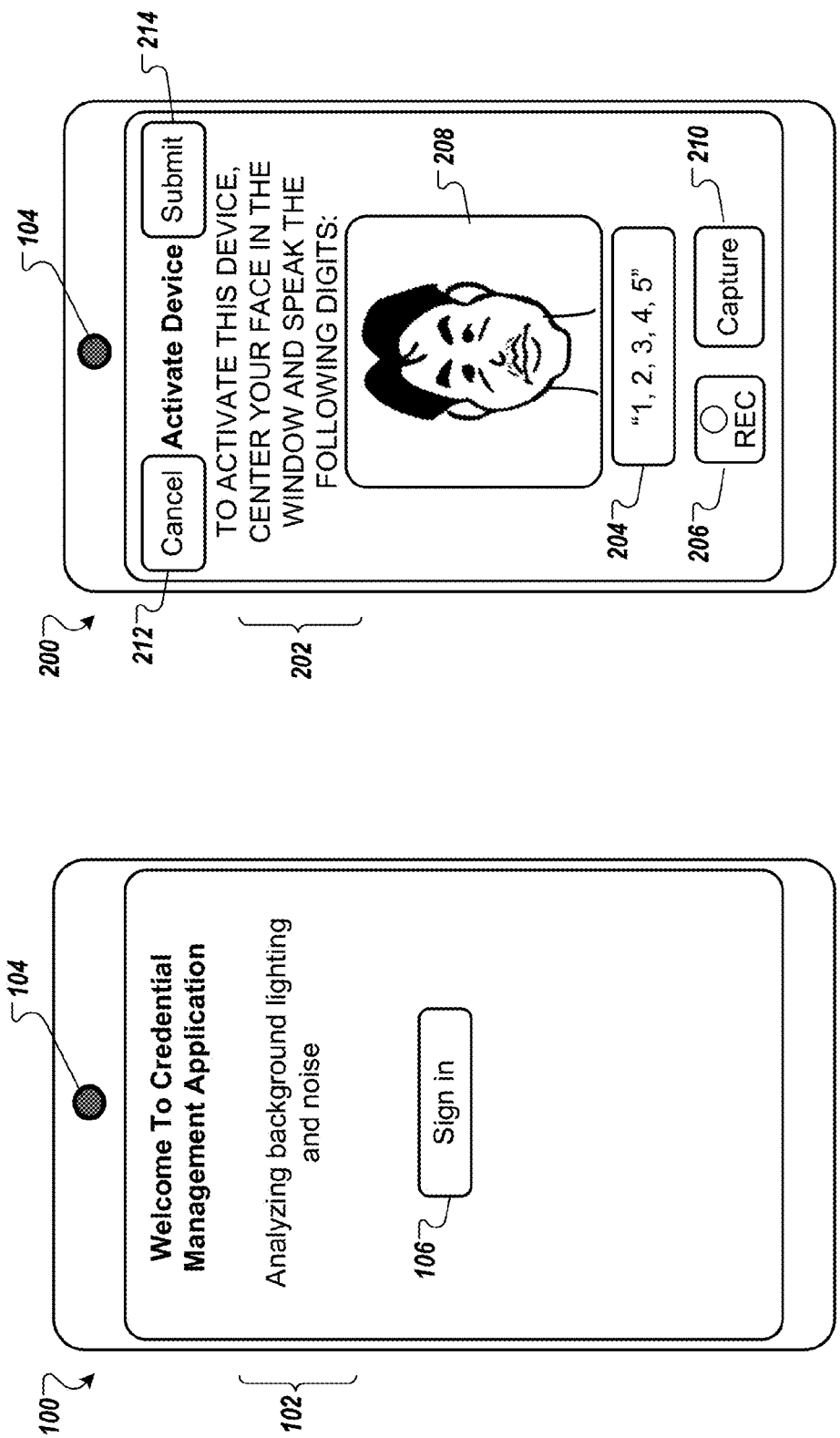

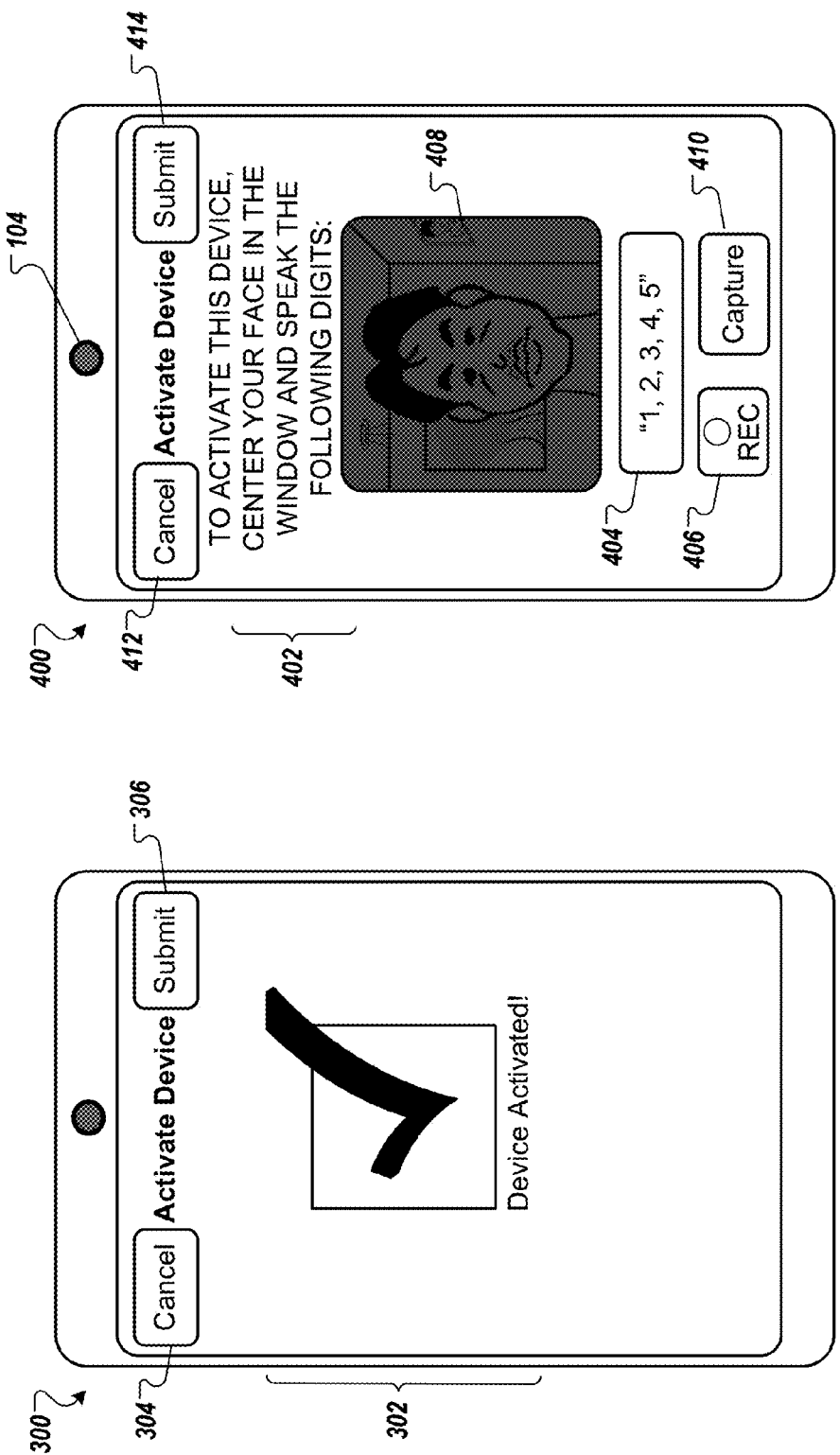

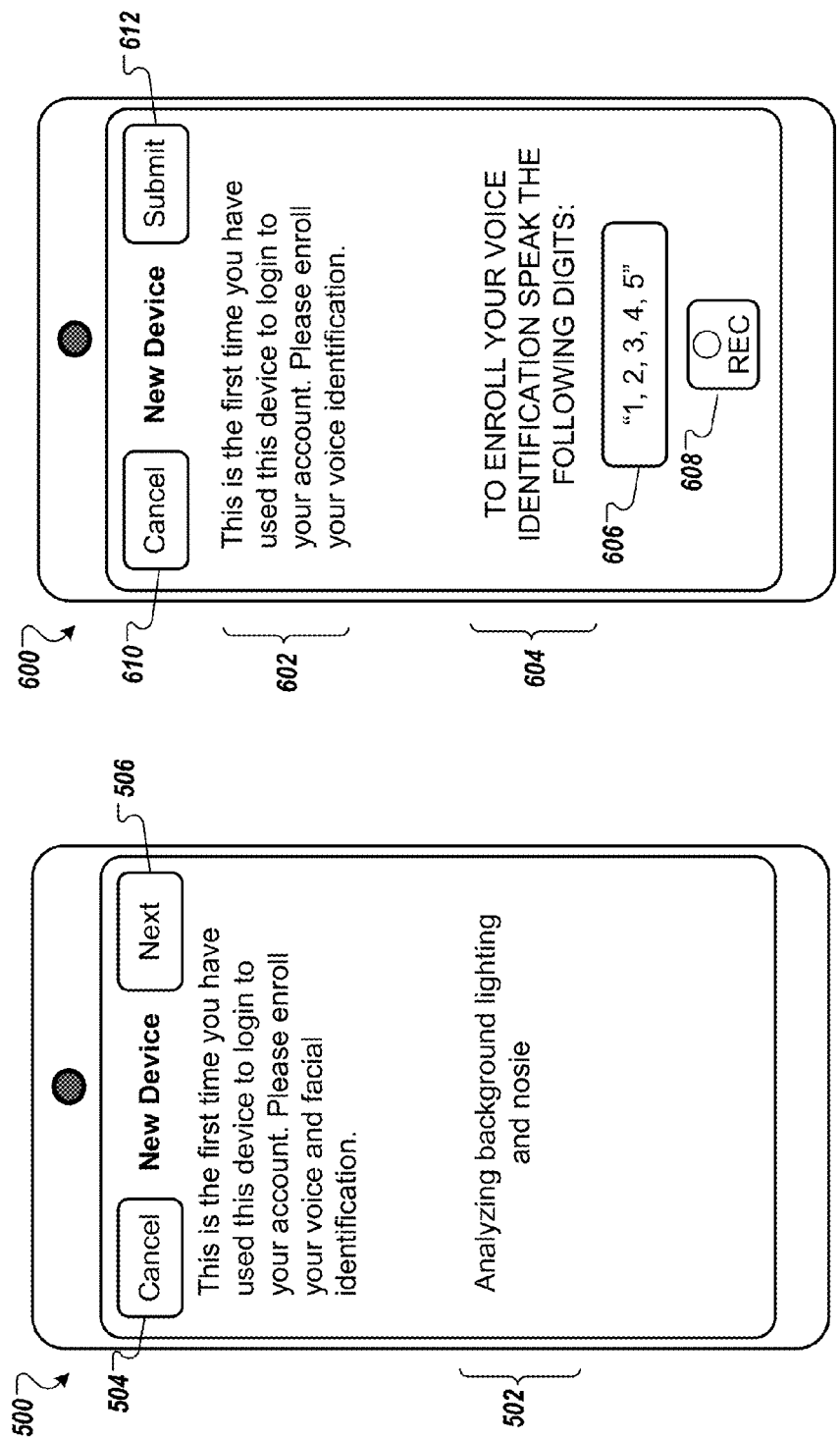

PERFORMING BIOMETRICS IN UNCONTROLLED ENVIRONMENTS

CROSS-REFERENCE TO RELATED APPLICATION

This application is a continuation (and claims the benefit of priority under 35 USC 120) of U.S. application Ser. No. 14/603,611, filed Jan. 23, 2015, now allowed, which claims the benefit of U.S. Provisional Application Ser. No. 61/931,311, filed Jan. 24, 2014. The entire contents of both of these applications are hereby incorporated by reference.

TECHNICAL FIELD

This specification generally relates to performing biometric operations in uncontrolled environments.

BACKGROUND

A user may perform biometric identification in uncontrolled environments.

SUMMARY

In general, one aspect of the subject matter described in this specification can be embodied in methods that include the actions of receiving data representing a first environmental condition and a second environmental condition. Receiving a first biometric identifier and a second biometric identifier, where the first environmental condition affects the quality of the first biometric identifier and the second environmental condition affects the quality of the second biometric identifier. Determining a first weight and a second weight based on the first environmental condition and the second environmental condition. Determining a first match score and a second match score, where the first match score is based on a comparison of the first biometric identifier to a first enrollment biometric identifier associated with a user and the second match score is based on a comparison of the second biometric identifier with a second enrollment biometric identifier associated with the user. Determining an authentication score based on applying the first weight to the first match score, applying the second weight to the second match score, and combining the first match score and the second match score. And, verifying an identity of the user based on the authentication score.

These and other implementations can each optionally include one or more of the following features. The first biometric identifier may include one of an image of a face, an image of an eye, a voice recording, a fingerprint, or a handwriting. The second biometric identifier may include one of an image of a face, an image of an eye, a voice recording, a fingerprint, or a handwriting, where the first biometric identifier and the second biometric identifier are different from each other. Verifying the identity of the user based on the authentication score may include verifying the identity of the user based on comparing the authentication score to a threshold value.

The method may include receiving a risk metric, and modifying the threshold value based on the risk metric. The risk metric may be one of a location of the client device, a motion signature of the client device, a time of day, a day of the week, or a characteristic of the client device.

Determining the first weight and the second weight based on the first environmental condition and the second environmental condition may include determining a first weight and a second weight based on the first environmental condition and the second environmental condition and using a statistical regression. Determining the first weight and the second weight based on the first environmental condition and the second environmental condition may include determining a first weight and a second weight based on the first environmental condition and the second environmental condition and using a machine learning technique. Determining the first weight and the second weight based on the first environmental condition and the second environmental condition may include determining a first weight and a second weight based on the first environmental condition and the second environmental condition and using a neural network.

The method may include providing one or more user credentials for display to the user in response to verifying the identity of the user based on the authentication score. The method may include causing an application to be opened on a client device in response to verifying the identity of the user based on the authentication score, where the application provides access to one or more user credentials associated with the user.

Another aspect of the subject matter described in this specification can be embodied in methods that include the actions of receiving an enrollment biometric identifier of a user. Determining a matching threshold based on a characteristic of the enrollment biometric identifier of the user. Storing the matching threshold in an enrollment profile for the use in association with the enrollment biometric identifier.

These and other implementations can each optionally include one or more of the following features. The method may include accessing a match score distribution for the enrollment biometric identifier of the user, and determining the matching threshold based on the characteristic of the enrollment biometric of the user may include determining the matching threshold based on the match score distribution for the enrollment biometric of the user. The method may include determining a distinctiveness of the enrollment biometric identifier of the user, and determining the matching threshold based on the characteristic of the enrollment biometric identifier of the user may include determining the matching threshold based on the distinctiveness of the enrollment biometric identifier of the user.

Determining a distinctiveness of the enrollment biometric identifier of the user may include classifying the enrollment biometric identifier as well behaved, and determining the matching threshold based on the characteristic of the enrollment biometric identifier of the user may include setting the matching threshold at a default value in response to classifying the enrollment biometric identifier as well behaved. Determining a distinctiveness of the enrollment biometric identifier of the user may include classifying the enrollment biometric identifier as difficult to recognize, and determining the matching threshold based on the characteristic of the enrollment biometric identifier of the user may include setting the matching threshold at a value below a default value in response to classifying the enrollment biometric identifier as difficult to recognize.

Determining a distinctiveness of the enrollment biometric identifier of the user may include classifying the enrollment biometric identifier as easily mimicked, and determining the matching threshold based on the characteristic of the enrollment biometric identifier of the user may include setting the matching threshold at a value above a default value in response to classifying the enrollment biometric identifier as easily mimicked. The method may include receiving data indicating an environmental condition, determining that the enrollment biometric identifier has an accuracy metric below a threshold, based on the data indicating the environmental condition, and requesting that the user provide another biometric identifier of a same type as the enrollment biometric in response to determining that the enrollment biometric identifier has the accuracy metric below the threshold.

The method may include receiving data indicating an environmental condition, and storing the data indicating the environmental condition in the enrollment profile for the user, in association with the enrollment biometric identifier.

Other features may include corresponding systems, apparatus, and computer programs encoded on computer storage devices configured to perform the foregoing actions. The details of one or more implementations are set forth in the accompanying drawings and the description, below. Other features will be apparent from the description and drawings, and from the claims.

DESCRIPTION OF DRAWINGS

FIG. 1 is an illustration of an example user interface of a biometric login screen for a credential management application on a client device.

FIG. 2 is an illustration of an example user interface for biometric authentication in a credential management application.

FIG. 3 is an illustration of an example of a client device activation screen.

FIG. 4 is an illustration of an example user interface for biometric verification in a credential management application under suboptimal environmental conditions.

FIG. 5 is an illustration of an example user interface of a biometric self-enrollment screen for a credential management application on a client device.

FIG. 6 is an illustration of an example user interface of a voice biometric self-enrollment screen for a credential management application on a client device.

DETAILED DESCRIPTION

Figure 8:
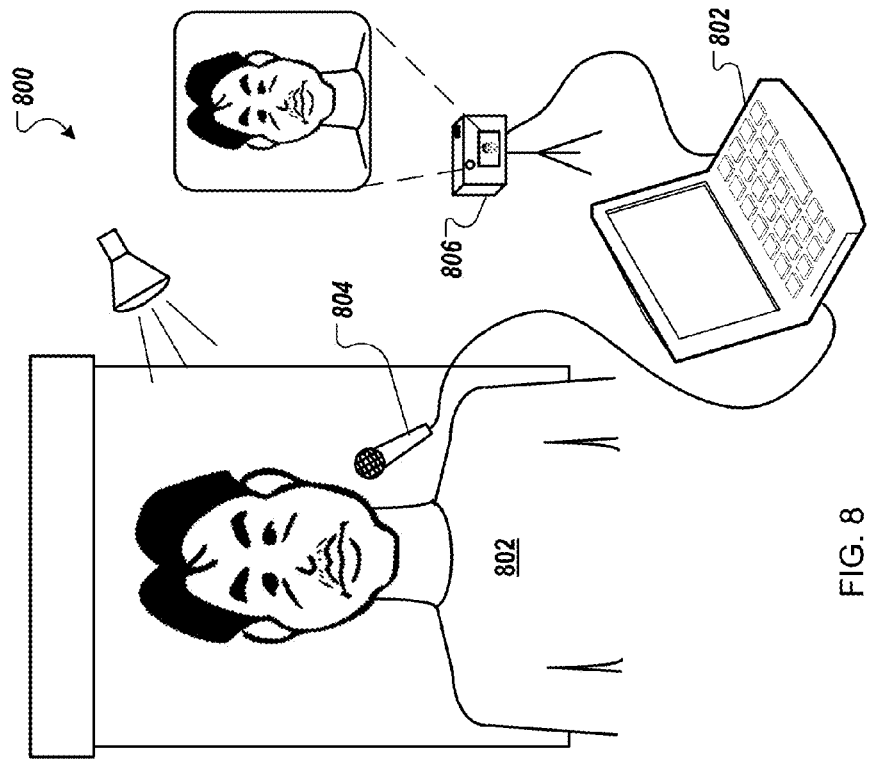
FIG. 8 is an illustration of an example biometric enrollment system.

In some instances, a user is required to provide biometric information (e.g., fingerprint, face scan, iris scan, retina scan, and/or voice identification) to access a particular application, device, system, or location. The user may not be in an ideal location for providing such biometric information and environmental conditions at the user's location may reduce the accuracy of the biometric information that the user provides. For example, a user may attempt to login to a smartphone application on a busy street corner using voice identification. The background noise will likely degrade the quality of the utterance provided by the user and affect the accuracy of the identity verification process. A biometric identification process may measure environmental conditions that could potentially affect biometric information provided by a user and weight multiple types of biometric information according to the measured environmental conditions to improve the accuracy of biometric identification in imperfect environments.

Throughout this document techniques and systems to perform biometric identification and verification are discussed in reference to a user logging into an example credential management application. However, the techniques and systems discussed may be implemented to allow a user to access any application, device, system, location, etc. In addition, the techniques discussed may be implemented as part of a biometric identification system (e.g., an FBI AFIS fingerprint database and Homeland Security IDENT database) or as part of a biometric identity verification system (e.g., a biometric login system associated with a particular user account).

FIG. 1 shows an example user interface 100 of a biometric login screen for a credential management application on a client device 101. A client device 101 may be any type of computing device, including but not limited to a mobile phone, smart phone, PDA, music player, e-book reader, tablet computer, laptop or desktop computer, computer kiosk, or other stationary or portable device, that includes one or more processors and non-transitory computer readable storage media. In some implementations, the user interface 100 shows a message 102 informing the user that the client device is "Analyzing background lighting and noise." At this time the client device 101 measures, analyzes, and/or records appropriate environmental conditions that may affect one or more biometric identifiers. For example, the client device 101 may measure background noise, which could affect voice identification, via a microphone on the client device. Similarly, for example, the client device 101 may measure lighting conditions, which may affect facial, iris, or retina identification, via a camera 104 on the client device 101. A user can select sign in button 106 to proceed with providing biometric pre-verification to sign into a credential management account.

In some implementations, a user may be required a pre-verify process to unlock the credential management application by means of one or more biometric methods of identification before being permitted to sign into a credential management account. For example, in some implementations client device 101 may be capable of receiving a fingerprint 108 of the user. A user's fingerprint 108 may then be used to unlock credential management application and sign the user into their account, as described above. In some implementations, the client device 101 may be capable of tracking user's gesture motion or behaviors, for example, using accelerometers. The credential management application may permit the user to unlock the application and sign into the user's account by using one or more determined gesture/motion patterns. For example, the user may trace a shape in the air with the client device 101 generating and unlocking motion pattern. The unlocking motion pattern may be compared to a stored motion profile of the user, and the application unlocked if the unlocking motion pattern is sufficiently similar to the user's stored motion profile In response, the client device 101 transmits to a server a request for access to the user account. The request may include data indicating the measured environment conditions to be used to improve the accuracy of biometric identification of the user. The server determines whether the requesting client device 101 has already been registered with the user account (e.g., by determining whether a valid certificate was included with the request). If so, and the application recognizes the device, the client device 101 then displays the user interface shown in FIG. 2.

FIG. 2 shows an example user interface 200 for biometric authentication in a credential management application. The user interface 200 includes a message 202 prompting the user that "To activate this device, center your face in the window and speak the following digits." The client device 101 provides a list of digits 204 (e.g., "1, 2, 3, 4, 5") that the user may utter into a microphone of the client device 101. The digits may represent a user's personal identification number (PIN) or may be a randomly generated list of digits. Alternatively or additionally, the client device 101 may provide a phrase for the user to utter into a microphone. The client device 101 may obtain the phrase, for example, by generating the phrase or receiving the phrase from the server (e.g., a phrase such as "purple money cows hungry applesauce jump clouds forever desk hurt happy cowboy"). To start and stop recording the utterance of the digits, the user selects the record button 206. In addition, user interface 200 may include one or more sound level bars 216 and 218. For example, sound level bar 216 may indicate the volume of the user's voice, while sound level bar 218 may indicate the volume of background noise.

In some implementations, a client device 101 may start and stop the recording of a user's utterance using Voice Activity Detection (VAD). For example credential management on-device application may begin recording, detect sound, display a list of digits 204, detect that the user has completed uttering the digits 204, and stop recording.

In addition, the user interface 200 includes a viewing window 208 which displays images captured by the client device's camera 104. To capture an image of the user's face, for example, the user may select the capture button 210 once the user has centered his/her face in the viewing window 208. The user interface 200 also includes a cancel button 212 to return to the previous screen (e.g., as shown in FIG. 2) and a submit button 214 to transmit the recorded utterance and image to the server.

In some implementations, liveness detection process on device may be used for face biometric enrollment, verification, and identification. In some implementations, a client device 101 may illuminate a user's face with a colored light 220. Based on color changes and shadows created by the colored light reflecting off the user's face, a client device 10 may detect whether the user space is close enough to the client device 101 prior to capturing an image of the user. In some implementations, a client device 101 may detect liveness (e.g., whether a face detected by the client devices camera 104 is a real face or a photo) based on the color changes in shadows created by the colored light reflecting off the user's face. Eye tracking and gaze detection also may be used for liveness verification in some implementations.

FIG. 3 shows an example of a client device 101 activation screen 300. Assuming that the server authenticates the user (e.g., the submitted utterance matches a voice print associated with the user's account and the submitted image matches a facial recognition data associated with the user's account), the server transmits a message to the client device 101 indicating that the user was authenticated and the client device 101 was registered with the user's account. (Details of the authentication process are described in conjunction with FIG. 9 below.) In some implementations, the message from the server includes a certificate that can be used by the client device 101 for subsequently accessing the user's account. The application notifies the user that the client device 101 has been successfully registered with the user's account by providing a "Device Activated!" message 302. The screen 400 also includes a cancel button 304 to cancel the registration procedure, and a submit button 306 to continue to access the user's account.

FIG. 4 shows an example user interface 400 for biometric verification in a credential management application under suboptimal environmental conditions. The user interface 400, is similar to that shown in FIG. 2. User interface 400 includes a message 402 prompting the user that "To activate this device, center your face in the window and speak the following digits." The client device 101 provides a list of digits 404 "1, 2, 3, 4, 5" that the user may utter into a microphone of the client device 101. The digits may represent a user's PIN or may be a randomly generated list of digits. To start and stop recording the utterance of the digits, the user selects the record button 406. In addition, the user interface 400 includes a viewing window 408 which displays images captured by the client device's camera 104. To capture an image of the user's face, for example, the user may select the capture button 410 once the user has centered his/her face in the viewing window 408. The user interface 400 also includes a cancel button 412 to return to the previous screen (e.g., as shown in FIG. 4) and a submit button 414 to transmit the recorded utterance to the server. In addition, user interface 400 may also include one or more sound level bars 416 and 418. For example, sound level bar 416 may indicate the volume of the user's voice, while sound level bar 418 may indicate the volume of background noise.

In contrast to user interface 200 of FIG. 2, the user interface 400 shows that environmental conditions are less than optimal for recording and analyzing biometric identification data associated with images captured from the client device's camera 104. For example, the image of the user displayed in viewing window 408 is dark due to poor lighting and the background behind the user is cluttered which may interfere with facial recognition algorithms. In addition, as indicated by sound level bars 416 and 418, the background noise (e.g., as indicated by sound level bar 418) is louder relative to the user's voice (e.g., as indicated by sound level bar 416) as compared to the environment as indicated by sound level bars 216 into 218 of FIG. 2. In such situations, the client device 101 or server may recognize these suboptimal conditions when initially analyzing environmental conditions, for example, as described above in conjunction with FIG. 1. As described in more detail below in connection with FIG. 9, upon recognizing these suboptimal conditions, the client device 101 or server may weight biometric identification image data provided by the user (e.g., facial, iris, or retina recognition data) less than biometric identification information audio data by the user (e.g., voice recognition data).

FIG. 5 shows an example user interface 500 of a biometric self-enrollment screen for a credential management application on a client device 101. User interface 500 may be displayed the first time that a user executes an application requiring biometric authentication or when a user first associates with an organization that requires biometric authentication to activate access certificates (e.g., beginning employment at a new company or matriculating at a university). User interface 500 enables a user to self-enroll their biometric data without the aid of other personnel (e.g., a human resources representative or information technology representative). The user interface 500 shows a message 502 informing the user that the client device 101 is "Analyzing background lighting and noise." At this time the client device 101 measures, analyzes, and/or records appropriate environmental conditions that may affect one or more biometric identifiers during enrollment. For example, the client device 101 may measure background noise, which could affect voice enrollment information, via a microphone on the client device 101. Similarly, for example, the client device 101 may measure lighting conditions, which may affect facial, iris, or retina enrollment information, by a camera 104 on the client device 101. The screen 500 also includes a cancel button 504 to cancel the self-enrollment procedure, and a next button 506 to continue to with the self-enrollment process. In response to a user selection of the next button 506, the client device 101 may either store for later transmission to a server or transmit to a server data indicating the measured environment conditions to be used by the server to evaluate the quality of the user's to-be-received biometric enrollment data.

FIG. 6 shows an example user interface 600 of a voice biometric self-enrollment screen for a credential management application on a client device 101. The user interface 600 includes a message 602 prompting the user that "This is the first time you have used this device to login to your account. Please enroll your voice identification." In addition, the user interface 600 includes a message 604 instructing the user "To enroll your voice identification speak the following digits." The client device 101 provides a list of digits 606 "1, 2, 3, 4, 5" that the user may utter into a microphone of the client device 101. The digits may represent a user's PIN or may be a randomly generated list of digits. Alternatively or additionally, the client device 101 may provide a phrase for the user to utter into a microphone. The client device 101 may obtain the phrase, for example, by generating the phrase or receiving the phrase from the server (e.g., a phrase such as "purple money cows hungry applesauce jump clouds forever desk hurt happy cowboy"). To start and stop recording the utterance of the digits, the user selects the record button 608. The user interface 600 also includes a cancel button 610 to return to the previous screen (e.g., as shown in FIG. 6) and a submit button 612 to transmit the recorded utterance to a server which can extract features from the utterance to generate a voice print that identifies the user.

Figure 7:
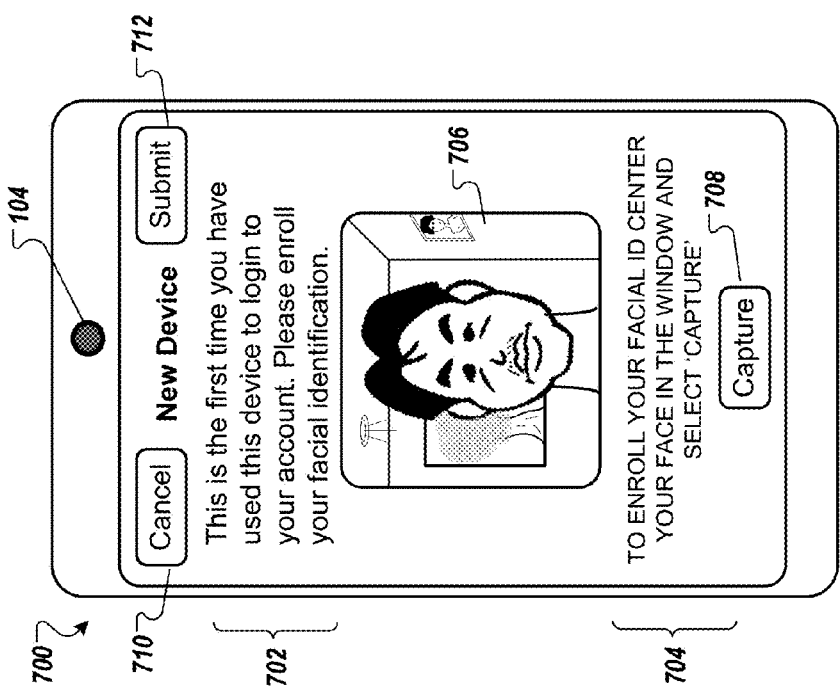
FIG. 7 is an illustration of an example user interface of a facial recognition biometric self-enrollment screen for a credential management application on a client device.

FIG. 7 shows an example user interface 700 of a facial recognition biometric self-enrollment screen for a credential management application on a client device 101. The user interface 700 includes a message 702 prompting the user that "This is the first time you have used this device to login to your account. Please enroll your facial identification." In addition, the user interface 700 includes a message 704 instructing the user "To enroll your facial ID center your face in the window and select 'capture.'" The user interface 700 includes a viewing window 706 which displays images captured by the client device's camera 104. To capture an image of the user's face, for example, the user may select the capture button 708 once the user has centered his/her face in the viewing window 706. The user interface 700 also includes a cancel button 710 to return to the previous screen (e.g., as shown in FIG. 7) and a submit button 712 to transmit user's image to a server which can extract features from the image to generate a facial recognition profile that identifies the user.

In some implementations, user interfaces 600 and 700 may be combined into a multi-biometric self-enrollment user interface. A multi-biometric self-enrollment user interface may permit a user to enroll multiple biometrics concurrently.

FIG. 8 shows an example biometric enrollment system 800. System 800 may be located in an office or other location with ideal background environmental conditions for obtaining biometric enrollment data. For instance, system 800 should be located in a quiet environment for obtaining voice identification data and should be well lit with uniform or semi-uniform background for obtaining facial, iris, or retina identification data. System 800 may be used to obtain biometric enrollment data with better quality for a user 802 instead the self-enrollment process illustrated in FIGS. 5-7, for example. System 800 includes a computing device 804 to record the biometric enrollment data and at least one device for recording biometric data, such as, a microphone 806, a camera 808, a fingerprint reader, a retina scanner, an iris scanner, signature pad, etc.

In some implementations, multiple users 802 may be enrolled concurrently, for example, using a video camera. For example, multiple users 802 may be concurrently enrolled while standing in hallway, in line-up, or at social event. In such implementations, for example, system 800 may receive a plurality of images and may cluster the images into groups of images depicting like faces (e.g., images of the same user). One or more images from each group may be selected, for example, based on image quality and associated with enrollment data for the respective user depicted in the images.

Figure 9:
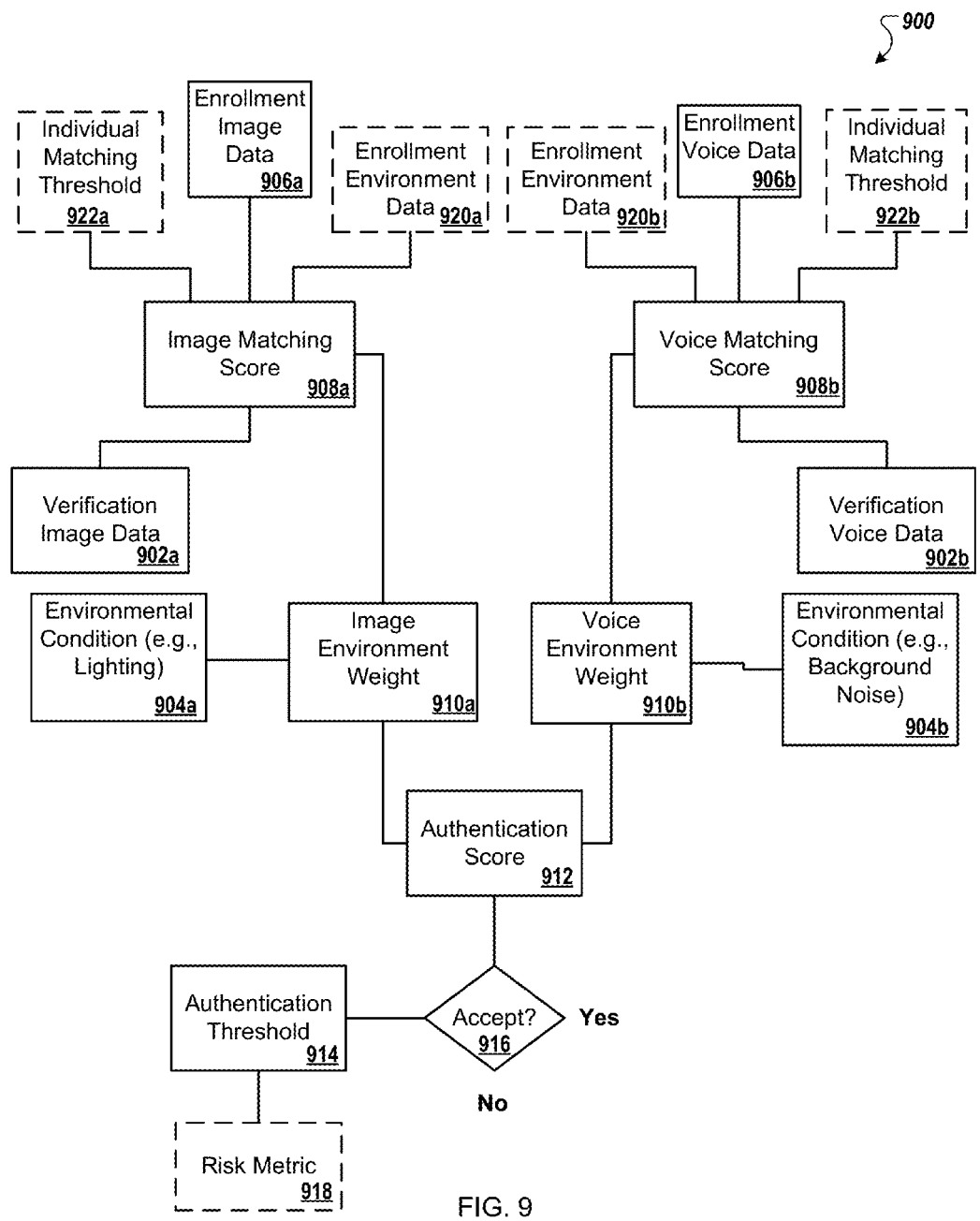
FIG. 9 is a flowchart of an example process for identifying an individual based on multiple biometric modalities in an uncontrolled environment.

FIG. 9 shows an example process 900 for identifying an individual based on multiple biometric modalities in an uncontrolled environment. Process 900 includes obtaining identity verification data from at least two biometric modalities, such as a verification image 902a of a user's face and verification voice data 902b (collectively, identity verification data), and measuring environmental conditions (904a and 904b) that may affect the quality of the identity verification data (902a and 902b) obtained from each of the biometric modalities. For instance, environmental conditions 904a such as lighting, shadows, and background clutter may be measured when verification image data 902a is obtained. Similarly, environmental conditions 904b such as background noise may be measured when verification voice data 902b is obtained.

The identity verification data (902a and 902b) may be obtained by capturing a digital image of a user's face and recording a user's utterance of a pre-defined or randomly generated phrase. The image and voice recording may be converted to an appropriate format to be compared against the user's enrollment biometric data (906a and 906b) to generate the identity verification data (902a and 902b) by, for instance, applying a biometric feature extraction method. For example, the verification image data 902a may be a feature vector that describes the unique features from the image of the user's face, and the verification voice data 902b may be a voice print obtained from the voice recording. Similarly, the enrollment image data 906a may be a feature vector describing the unique features from an enrollment image of the user's face and an enrollment voice data 906b may be a voice print of an enrollment recording of the user's voice. The enrollment data (906a and 906b) may be stored on the user's client device or at a server, and represents an authentic sample of the user's identity.

The verification image data 902a is compared with the enrollment image data 906a to calculate an image matching score 908a. The image matching score 908a provides an indication of the similarity between the verification image data 902a and the enrollment image data 908a, and therefore, a confidence level that the identity of the user from whom the verification image data 902a was obtained is the same individual represented by the enrollment image data 906a. Similarly, the verification voice data 902b is compared with the enrollment voice data 906b to calculate a voice matching score 908b. The voice matching score 908b provides an indication of the similarity between the verification voice data 902b and the enrollment voice data 908b independent from the image matching score 908a. The voice matching score 908b also indicates a confidence level that the identity of the user from whom the verification voice data 902b was obtained is the same individual represented by the enrollment voice data 906b. The use of two or more independent biometric modalities increases the overall accuracy of biometric identification.

An image environment weighting 910a and a voice environment weighting 910b is generated based on corresponding environmental conditions (904a and 904b respectively) that were measured. For instance, a user may be located in a quiet, but poorly lit environment. In such circumstance, voice based biometric data will likely be more accurate than image based biometric data and the voice environment weighting 910b will be greater than the image environment weighting 910a. Therefore, the voice matching score 908b will be given more weight in generating the authentication score 912 than the image matching score 908a. The environmental conditions under which the biometric identity verification data are obtained can tend to reduce the quality of the acquired biometric data, thereby, increasing the false rejection rate (FRR). By weighting the scores for each biometric based on the measured environmental conditions that affect each particular biometric, the overall accuracy of a multimodal biometric identification process may be improved. For instance, a user may be located in a quiet, but poorly lit environment. In such circumstance, a voice based biometric data will likely be more accurate than image based biometric data. Therefore, the voice matching score 908b should be given more weight in generating the authentication score 912 than the image matching score 908a. The image environment weight 910a and a voice environment weight 910b may each be generated using methods such as classifier techniques using machine learning (ML), Neural Networks (NNs), statistical regression, or a hybrid method.

An authentication score 912 is generated by weighting the image matching score 908a and the voice matching score 908b with the image environment weight 910a and the voice environment weight 910b, respectively, and combining the weighted values. The authentication score 912 may be generated using methods such as weighted sum, weighted product, minimum or maximum score, quality weighting, and user weighting. The authentication score 912 represents an overall confidence level that an identity of a user represented by the enrollment image data 906a and the enrollment voice data 906b matches the user from whom both the verification image data 902a and the verification voice data 902b were obtained.

The identity of a user is then authenticated 916 by comparing the authentication score 912 to an authentication threshold value 914. If the authentication score 912 exceeds the threshold value 914 the user's identity is successfully authenticated, otherwise the user's biometric authentication fails. Proper authentication of a user may be used to provide the user access to a credential management account (e.g., the user's credential management account as described in more detail below in reference to FIG. 10). For example, in response to verifying the identity of a user the user may be provided with one or more user credentials (e.g., one or more user credentials may be displayed on a user's client device).

Process 900 as described above represents a method of fusing data from multiple biometric modalities at the matching level. Examples of fusion of biometric modalities at other levels of the biometric authentication process are described in the article Ross, A., Jain, A., "Information fusion in biometrics," *Pattern Recognition Letters,* 24 (2003) 2115-2125 (hereinafter Ross, et. al.). Ross, et. al. describes three potential levels for fusion of biometric data, "(a) fusion at the feature extraction level, (b) fusion at the matching score level, (c) fusion at the decision level." In addition, a fourth fusion method, rank order fusion, is also possible. Table 1, below summarizes the four methods and a combined hybrid fusion method.

TABLE 1

Biometric Fusion Options

| Method | Description | Advantages |
| --- | --- | --- |
| Feature Extraction Level Fusion | Raw data from the sensor is combined, e.g. mosaicking multiple fingerprints impressions. May include various Liveness detection measures from a single scanning device. | More feature points and information to Improve accuracy. |
| Matching Level Fusion | The scores from multiple matchers are mathematically combined. Techniques include sum, product, weighted sum, weighted product, minimum or maximum score, quality weighting, user weighting, and classifier techniques using machine learning (ML) and Neural Networks (NNs) method | Proven effective and available in some commercial of the shelf (COTS) products. |
| Rank Order Fusion | Each identity is assigned the best rank computed by different algorithms such as 1) highest rank, 2) Borda count, or 3) weighted Borda | Simple computation. More effective than Decision Level Fusion. |
| Decision Level Fusion | Each matcher makes a yes/no decision and the decision is based on majority voting. | Simple computation. Available using any COTS product. |
| Combined Fusion Methods | Two or more fusion methods may be combined, e.g., rank order fusion and score level fusion, also called hybrid fusion strategy | Improves accuracy. Can detect spoofing and bad data, e.g., biometrics associated with wrong person. |

Although, the process 900 is described as applying the image environment weight 910a and the voice environment weight 910b at the matching level (i.e., to the image and voice matching scores 908a and 908b respectively) the environment weights (910a and 910b) may be calculated and applied at any biometric fusion level. For instance, in some implementations, the environment weights (910a and 910b) may be applied at the feature extraction level. Fusion at the feature extraction level is described by Ross, et. al. as "Fusion at the feature extraction level: The data obtained from each sensor is used to compute a feature vector. As the features extracted from one biometric trait are independent of those extracted from the other, it is reasonable to concatenate the two vectors into a single new vector. The new feature vector now has a higher dimensionality and represents a person's identity in a different (and hopefully more discriminating) hyperspace. Feature reduction techniques may be employed to extract useful features from the larger set of features." In such an implementation the environment weights (910a and 910b) may be applied to each applicable feature vector prior to concatenating the feature vectors to form the single new feature vector.

In some implementations, the environment weights (910a and 910b) may be applied at the decision level. Fusion at the feature decision level is described by Ross, et. al. as "Fusion at the decision level: Each sensor can capture multiple biometric data and the resulting feature vectors individually classified into the two classes—accept or reject. A majority vote scheme, such as that employed in (Zuev, Y., Ivanon, S., 1996, "The voting as a way to increase the decision reliability," *Foundations of Information/Decision Fusion with Applications to Engineering Problems*, Washington, D.C., USA. pp. 206-210.) can be used to make the final decision." In such implementations the environment weights (910a and 910b) may be applied to each applicable feature vector, effectively weighting the votes.

In some implementations, for example, a biometric identification process may employ multiple sensors to acquire one particular type of biometric modality (e.g., multiple cameras each having a different viewing angle to acquire facial recognition data). In such implementations, each sensor may measure its own corresponding environmental conditions (e.g., environmental condition 904a may become 904a1, 904a2, 904a3 . . . ) and a computing device or a server may calculate corresponding environment weights (e.g., image environment weight 910a may become 910a1, 910a2, 910a3 . . . ). Each environment weight may then be applied to the facial recognition data obtained from corresponding camera, for example, at the feature extraction level described above.

Some implementations, may include one or more risk metrics 918 which may be used to adjust the authentication threshold 914 and/or weight the authentication score 912. A risk metric 918 may indicate that a user is requesting biometric identification at a time, from a place, or using a device which is outside the normal routine for that specific user. In such implementations, the risk metric 918 allows process 900 to provide added security by increasing the scrutiny of biometric data in such circumstances. For instance, a risk metric 918 may indicate that a user is requesting a biometric identification from an unusual location and the risk metric 918 may be used to increase the required authentication threshold 914 (or correspondingly decrease the authentication score 912), thereby making process 900 more stringent and increasing the overall security of the biometric identification process.

For example, a user, John Smith, may use biometric verification to log into a credential management application on his smartphone every week day while at work in Washington, D.C. Then while in San Diego on travel Mr. Smith may attempt to login to the same application. It may be desirable to have increased security for the credential management application's biometric login when the user attempts to login from an unusual location to guard against false positive identifications (FARs). For instance, Mr. Smith's smartphone may be in San Diego because it was stolen from him while on vacation. Adjusting the authentication threshold 914 and/or the authentication score 912, in such manner, based on various risk metrics 918 may increase the security of a biometric identification process.

Risk metrics 918 may include the location of a client device, time of day, a user's motion profile (e.g., how a particular user carries/uses a smartphone), a user's use profile for a client device (e.g., number/type of applications on the device, photos stored the device, a contacts in a user's contact list), and a user's normal login frequency. For instance, if a user generally performs a specific biometric identification process during working hours, the authentication threshold 914 may be increased if the user attempts to login at 1:00 AM. Similarly, for example, if a particular user generally uses either his laptop computer or smartphone to log into a credential management application using a biometric identification process, but on a particular occasion attempts to log in to the credential management application from a tablet computer then the authentication threshold 914 may be increased since this is an unusual behavior, and may actually be an attempt to login to the particular user's account by an unauthorized individual. Furthermore, the risk metrics 918 may be evaluated by either a client device or a server.

In some implementations, process 900 may include measuring environmental conditions at the time the user enrolls his or her biometric data and storing enrollment environment data 920a and 920b representing the measured environmental conditions on a client device or at a server as. For example, a user may enroll facial identification data from a client device while at home (e.g., a university may require a student to enroll biometric identification data in association with the student's student ID on the student's smartphone). As described above, the user's client device may measure the environmental conditions (e.g., lighting and background clutter). Enrollment environment data 920a and 920b representing the environmental conditions during the user's enrollment may be stored on the client device or at a server in a biometric identification profile for the user and in association with the applicable biometric enrollment data (e.g., 906a or 906b). The Enrollment environment data 920a and 920b may then be used calibrate an appropriate individual matching threshold value 922a and 922b for each enrollment biometric modality provided by the user. In some implementations, the calibration of an individual matching threshold value 922a and 922b may be optimized over time using historic matching results. In some implementations, if the enrollment environment data 920a and 920b indicates that a particular enrollment biometric may be of particularly poor quality, the client device may request that the user re-enroll.

In some implementations, the client device or server may evaluate the enrollment biometric data (e.g., enrollment image data 906a or enrollment voice data 906b) itself in order to calibrate an associated individual matching threshold value 922a or 922b. Some people have biometric attributes that are particularly difficult to recognize accurately and result in either an excessive false rejection rate (FRR) or false acceptance rate (FAR). For example, one person may have relatively generic facial features (e.g., eye spacing, mouth shape, nose shape, etc.), and therefore, be easily mistaken for other people resulting in a high FAR for that person. Similarly, another person may have facial features that are difficult for computer biometric systems to recognize, thus resulting in a high FRR for that person. An analysis as described in the article Ross, A., Rattani, A., Tistarelli, M., "Exploiting the 'Doddington Zoo' Effect in Biometric Fusion, *Proc. of 3rd IEEE International Conference on Biometrics: Theory, Applications and Systems (BTAS)*, (Washington D.C., USA), September 2009 (hereinafter Rattani, et. al.) may be performed on enrollment biometric data to properly classify each user's biometric enrollment data. The results of such analysis may then be used to calibrate the individual matching threshold value 922a and 922b associated with each biometric type for the users.

For example, Rattani, et. al. describes that "Doddington et al [9] classify users, in the context of a speaker recognition system, into different groups based on their propensity to contribute to the False Reject and False Accept Rates (FAR and FRR) of a biometric system. The resulting classification, known as 'Doddington's Zoo', assigns users into several categories labeled as Sheep, Lambs, Goats and Wolves. Sheep are well behaved users exhibiting low FRRs and whose feature sets are well separated from other users in the database. Goats are users who are intrinsically difficult to recognize and they tend to adversely degrade the performance by increasing FRR. Lambs are users whose biometric feature set overlaps significantly with other users in the database thereby contributing to a high FAR (zero-effort attack); according to Doddington et al [9], these users can be easily mimicked. Wolves are individuals who have the capability to spoof the biometric characteristics of other users: they too contribute significantly to the FAR of the system (spoof attack). Sheep (well behaved users) usually dominate the population. While Goats, Lambs and Wolves represent only a very small fraction of the database, their contribution in terms of the overall error rate of the biometric system can be large. Users in these categories are therefore referred to as weak users due to their negative impact on the error rate of the system." Accordingly, for example, if a user's facial recognition data is classified as a goat (i.e., a high chance of FRR) the individual matching threshold value (e.g., 922a) associated with that user's facial recognition biometric data may be lowered from a default value. Similarly, for example, if a user's facial recognition data is classified as a lamb (i.e., a high chance of FAR with other people) the individual matching threshold value (e.g., 922a) associated with that user's facial recognition biometric data may be increased.

In addition, Rattani, et. al. describes several example methods for categorizing users using Doddington Zoo and FRatio based approaches which may be used to properly classify each user's biometric enrollment data and calibrate the individual matching threshold values 922a and 922b associated with each type of biometric enrolled for the users. The contents of Rattani, et. al. (Ross, A., Rattani, A., Tistarelli, M., "Exploiting the 'Doddington Zoo' Effect in Biometric Fusion, *Proc. of 3rd IEEE International Conference on Biometrics: Theory, Applications and Systems (BTAS)*, (Washington D.C., USA), September 2009) is hereby incorporated by reference in its entirety.

While the example process 900 is described as combining facial identification with voice identification, any combinations of two or more biometric modalities is possible (e.g., fingerprint, iris, retina, signature, hand geometry, etc.). In addition, process 900 may be implemented as part of a biometric identification system (i.e., as system in which the identity of a user is not known a priori and in which a search for a matching identity is performed) or as part of a biometric identity verification system (i.e., a system in which the identity of a user is compared against biometric features of an expected user's identity to validate that the user is who he says he is).

Figure 10:
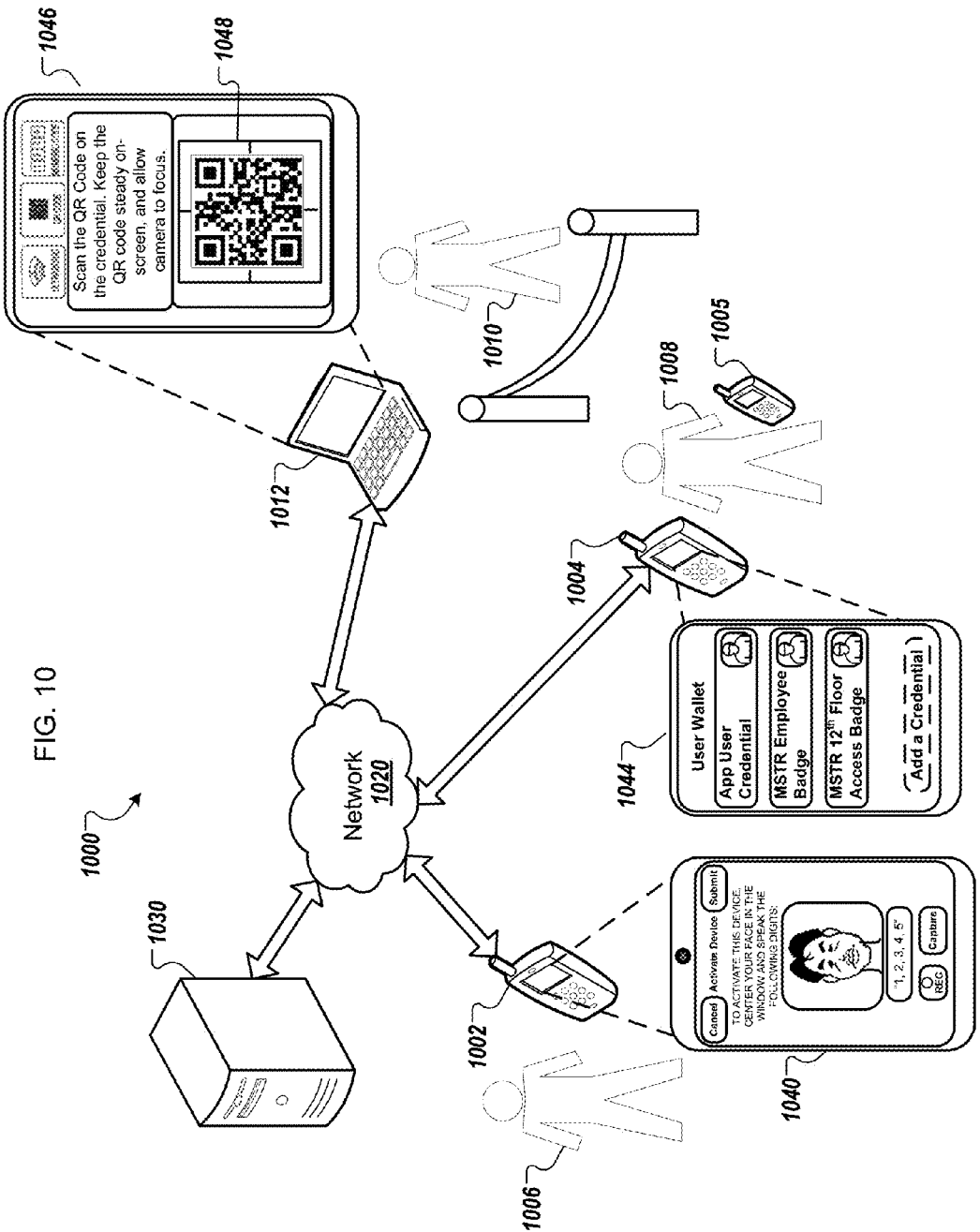
FIG. 10 is an illustration of an example system for management, distribution, and validation of user credentials which incorporates biometric authentication.

FIG. 10 shows an example system 1000 for management, distribution, and validation of user credentials which incorporates biometric authentication. As an overview, a credential management server 1030 communicates via a network 1020 with client device 1002 operated by user 1006, and client devices 1004, 1005 operated by user 1008. For example, the user 1008 may have a work client device 1004 and a personal client device 1005. The client devices 1002, 1004, and 1005 execute mobile credential management applications that allow them to manage, access, and output multiple credentials. The server 1030 also communicates via network 1020 with a processing system 1012 operated by a validation entity 1010. The validation entity 1010 operates the processing system 1012 to validate credentials presented by the users 1006, 1008 on their client devices 1002, 1004, 1005 by communicating with the server 1030 as described below.

In operation, the server 1030 manages and/or stores one or more credentials, associates users and groups of users with appropriate credentials, grants access to user accounts, and provides credentials to users' client devices and/or processing systems (e.g., operated by credential authorities). The server 1030 can be any suitable computer or collection of computers executing software capable of managing, distributing, and/or validating representations of credentials for users and groups of users via a network 1020 as described herein.

Credentials, user accounts, group accounts, and administrative accounts can be stored in a database (e.g., MySQL, PostgreSQL, MS SQL Server, MongoDB), or other suitable data structure that can be accessed by the server 1030. In some implementations, the server 1030 may access the stored credentials and/or user accounts via web services such as representational state transfer (REST) style services.

As an initial step, the server 1030 creates a credential based on input provided by a credential grantor (e.g., an employer). The credential may include a variety of information such as a credential identifier (e.g., a number or alphanumeric character string that uniquely identifies a credential), a description of an event or location, and one or more designated validation entities.

The server 1030 may present a suitable interface to the credential grantor for creation of credentials. For example, the server 1030 may present a web interface through which grantors can interact via a Web browser. In other aspects, the server 1030 may be directly accessible via a graphical-user interface or an application running on a mobile device. Any suitable interface can be used that enables the creation and storage of credentials, and user accounts. In addition (or as an alternative) to creation of credentials by credential grantors, credentials could be created at the request of registered users through a web-based or other interface, or through any other suitable mechanism such as sending email or short message service (SMS) transmissions to grantors. In some implementations, registered users may be able to create credentials by use of an application running on a client device.

The server 1030 also may present an interface so that users and/or credential grantors can create user accounts for individual users and groups of users. For example, the server 1030 may present a web interface through which credential grantors can interact via a Web browser. Additionally or alternatively, the server 1030 may be directly accessible via a graphical-user interface or an application on a mobile device. User accounts may be stored in a table or collection of tables in a database, or in any other suitable data structure accessible by the server 1030. The user accounts may include a variety of information such as user name, user title, user identifier (e.g., a number or character string that uniquely identifies a user), one or more addresses (e.g., email addresses and/or mobile phone numbers), identifiers of one or more client devices owned by or otherwise associated with the user, and/or certificates associated with client devices. In some implementations as described below, user accounts may also be associated with a biometric profile of the user. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device 1002, 1004.

To create a new user account with the server 1030, the credential management application may require a new user 1006, 1008 to complete an initial account registration (e.g., enrollment). As part of the initial account registration process, the new user 1006, 1008 may be required to provide biometric information (e.g., a voice sample, fingerprint, signature, iris scan, retina scan, and/or facial scan, etc.) to the mobile credential management application, which can be transmitted to the server 1030. Subsequently, the server 1030 can generate a biometric profile of the user 1006, 1008 based on the biometric information and associate the biometric profile with the user's account. For example, the user 1006, 1008 may be required to provide a voice sample by uttering a phrase into a microphone of the user's client device 1002, 1004. The client device 1002, 1004 may transmit this voice sample to the server 1030, which can extract features from the voice sample to generate a voice print that identifies the user. The mobile credential management application may automatically register the client device from which the new user completes the initial account registration process as an authorized device for the new user's account.

Upon completion of initial account registration, the server 1030 may transmit a certificate to the client device 1002, 1004 that was used for the registration, for example via the network 620. The server 1030 also may associate the certificate with the user's account and the particular client device. For example, the server 1030 may store the certificate in a memory structure (e.g., a file system or database) and add an entry to the user's account identifying the certificate. A certificate may be, for example, a public key certificate and/or an authorization certificate. In some implementations, a certificate may be in a format specified in the X.509 ITU-T standard.

A public key certificate may be an electronic document that uses a digital signature to bind a public key with an identity. In particular, a public key certificate may include information such as a unique certificate identifier, a user name or user account number, a signature algorithm (RSA, Digital Signature Algorithm (DSA), or Elliptic Curve Digital Signature Algorithm (ECDSA)), a signature, an issuer name, and a public key. The public key certificate can be used to verify that a public key belongs to a user. In a typical public key infrastructure scheme, the signature will be of a certificate authority. In a web of trust scheme, the signature is of either the user (a self-signed certificate) or other users. In either case, the signatures on a certificate are attestations by the certificate signer that the identity information and the public key belong together.

An authorization certificate may be an electronic document that includes authorization information associated with a holder of the certificate. For example, the authorization certificate may indicate that the holder of the certificate is authorized to access a resource, service, or location. In particular, an authorization certificate may include information such as an issuer name, a signature algorithm, a signature, a unique certificate identifier, and identifiers of the resources, services, or locations that the certificate authorizes access to.

An individual may be able to access the individual's user account and credentials from multiple different client devices. When a user 1006, 1008 attempts to login to the application from a client device 1002, 1004 that the user has not previously registered with the credential management server 1030, the credential management application may recognize the client device as a new device. For example, the application may determine that the new device lacks a certificate from the server 1030 by querying a memory location where the certificate would be stored. As a result of determining that the device is a new device, before allowing the user to access the user's account, the credential management application may require the user to authenticate himself/herself at the new device. For example, a user may be required to provide one or more means of biometric identification and the credential management application may verify the user's identity through a process such as process 900 described above in reference to FIG. 9, for example. In some implementations, the credential management application may require a user to authenticate himself/herself before allowing the user to access the user's account from any device regardless of whether the device is recognized by the credential management application or the device is a new device.

In particular, the mobile credential management application may require the user to provide biometric identification (e.g., an utterance, fingerprint, iris scan, retina scan, and/or face scan, etc.). For example, the credential management application may prompt the user 1006, 1008 to utter a phrase. As referred to herein, a phrase may be a sequence of two or more words selected from one or more dictionaries of words that need not form a grammatical construct. A dictionary as used herein is a data structure in which index values identify words. A given dictionary may include many thousands of different words. In some implementations, the application on the client device 1002, 1004 may select a phrase based on an index that can be randomly generated or generated based on a current time. In some implementations, the user may utter a phrase of their choosing. Alternatively or in addition, the server 1030 may select a phrase and transmit the phrase to the application on the client device 1002, 1004, where the phrase can be displayed to the user. Moreover, in some implementations, rather than transmitting the phrase directly to the mobile application on the client device 1002, 1004, the server 1030 may transmit the phrase to an email address or mobile phone number (via SMS for example) associated with the user account. Advantageously, transmitting the phrase in this manner may provide an additional level of authentication because the user will have to access the email account or SMS inbox to obtain the phrase.

When the user utters the phrase into a microphone of the client device 1002, 1004, the application may encode the utterance and transmit data representing the utterance to the server 1030. The server 1030 can then perform speaker recognition on the phrase uttered by the user 1006, 1008 to authenticate the user. For example, the server 1030 can retrieve a voice print associated with the user's account from a memory structure (e.g., a file system or database), and then compare the characteristics of the utterance with the user's voice print. Alternatively or in addition, the client device 1002, 1004 may obtain a voice print of the user (e.g., receive the voice print from the server 1030 or from a third-party server that stores user voice prints), and then perform speaker recognition using the obtained voice print.

In addition, as described in regard to FIG. 9 above, the user also may provide an iris image, a retina image, a fingerprint image, and/or a facial image for authentication. For example, the user may take an image of the user's eye or face using a camera attached to the client device 1002, 1004. The image may then be transmitted to the server 1030 for verification or verified on the client device 1002, 1004. In some implementations, the client device 1002, 1004 may have a fingerprint scanner operatively coupled to the device, in which case the user 1006, 1008 may provide a scan of one or more fingerprints. The fingerprints can then be transmitted to the server 1030 for verification or verified on the client device 1002, 1004.

In some implementations, the mobile credential management application may employ multi-factor authentication to authenticate a user at a new device. For example, the user may have to provide two or more inputs to authenticate a new device. These inputs may include any suitable combination of: an utterance, an alphanumeric code sent to an email address associated with the user account, an iris scan, a fingerprint scan, and/or a facial scan. For example, the server 1030 may transmit an alphanumeric code to an email address or mobile phone number (via SMS for example) associated with the user account, and require both the alphanumeric code and an utterance that matches the voice print associated with the user account to register a new device.

Multiple different users may be able to register the same client device for use with multiple different user accounts, respectively, for example if several users share the same client device. In particular, each user may login to their user account from the same client device and authenticate himself/herself and receive a certificate associated with their user account as described above. The client device may then store the certificates for the different users in memory. When a user attempts to access the user's user account from the client device, the application can then retrieve the relevant certificate for the user.

Some implementations may include a master client device associated with a user account that has additional privileges. For example, the master client device may have the capability to confirm that a client device may be registered with a user account and/or may be able to deactivate registered client devices. In particular, when a user attempts to login to the user's user account from a new device, in addition to the biometric verification discussed above, the server 1030 may notify the master client device and require confirmation from the master client device prior to registering the new device. The master client device also may deactivate a client device registered with a user account, for example, by transmitting a deactivation message to the server 1030, which then removes the client device from a list of client devices that are permitted to access the user account. The master client device may be the original client device used to setup the user account by default, or may be another device chosen by the user. In some implementations, the server 1030 may require additional levels of authentication to setup or change a master client device. For example, if the server 1030 requires only an utterance to register a normal client device, the server 1030 may require both an utterance and an alphanumeric code transmitted to an email address associated with the user account to establish (e.g., register or change) a master client device.

Upon successful authentication, the server 1030 registers the new device 1002, 1004 as an authorized device for the user's account and transmits a certificate to the new device as described above. The certificate subsequently enables the application to recognize the device as having been registered with the user's account.

In some implementations, a user can have the certificate deleted from a client device. This may provide additional security by causing a user to perform another authentication to access their user account from the device. For example, the client device may automatically delete a certificate from a client device when a user logs out of the user's account from the device. Alternatively or in addition, the user may cause a certificate to be deleted from a client device as part of deactivating the client device from a master client device as described above. In addition, a user may choose to delete a certificate from a client device as an option when the user is logged into their user account from the device.

As an example, Mr. John Smith (user 1008) may request to setup a new user account on the server 1030 using an application executing on his work client device 1004. The client device 1004 prompts Mr. Smith to provide biometric information (e.g., an utterance, a fingerprint, facial scan, and/or iris scan), which is transmitted to the server 1030. The server 1030 can then create database entries representing a user account for Mr. Smith, where the user account includes a biometric profile incorporating the provided biometric information. A credential grantor could then create a row in another table for a group identified as employees of Company X. The grantor and/or server 1030 could then link the database entry for Mr. Smith to the group account for Company X through use of a linking table. Finally, the server 1030 may transmit a certificate to the client device 1004 that allows Mr. Smith to access his new user account from device 1004 without providing biometric identification.

Subsequently, Mr. Smith attempts to access his user account using a credential management application on his personal client device 1005. The client device 1005 (or the server 1030) recognizes that the client device 1005 is not registered with his user account (e.g., by determining that the client device 1005 lacks a certificate associated with the user account). Accordingly, the application on client device 1005 prompts Mr. Smith to provide biometric information to verify his identity. The client device 1005 then transmits this biometric information to the server 1030, which compares the biometric information with the biometric profile associated with Mr. Smith's account to verify Mr. Smith's identity. For example, the client device 1002 of user 1006 is executing an application that displays a user interface 1040 (similar to user interface 200 in FIG. 2) including biometric verification login. Finally, the server 1030 transmits a certificate to Mr. Smith's personal client device 1005, thus enabling Mr. Smith to access his user account from device 1005.

Once credentials and user accounts have been created, credential grantors and/or users can associate the credentials with user accounts, or groups of users. For example, the server 1030 may present a web interface through which grantors can interact via a Web browser to link a given credential to a given user or group of users. In other aspects, the server 1030 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 1030 also may notify the users that they have been associated with the credential(s), for example by pushing notifications to the respective users' client devices. Such notifications may include the credential identifier.

Once credentials have been associated with appropriate user and/or group accounts, the credentials can then be distributed to client devices for the appropriate users via the network 1020. For example, the network 1020 may be a local area network ("LAN") and a wide area network ("WAN"), e.g., the Internet. In some versions, the server 1030 may communicate with the client devices via SMS or multimedia messaging service (MMS). The server 1030 may access user accounts in a database to locate the appropriate users' client devices.

Credential management applications executing on client devices 1002, 1004, and 1005 can receive the credentials associated with their respective users 1006, 1008 and store them in any suitable memory for later retrieval. A given user 1006, 1008 may be associated with multiple different credentials. Some or all of the credentials associated with a user 1006, 1008 may be accessible on a user's client device 1002, 1004, and 1005. In particular, mobile credential management applications executing on the client devices 1002, 1004, 1005 can then retrieve the credentials so they can be used for generating and presenting a representation of the credential to a validation entity for validation. The client devices 1002, 1004, 1005 may be any type of computing device, including but not limited to a mobile phone, smart phone, PDA, music player, e-book reader, tablet computer, laptop or desktop computer, computer kiosk, or other stationary or portable device, that includes one or more processors and non-transitory computer readable storage media. The software application can be written in any suitable programming language such as, for example, Objective-C, C++, Java, etc.

In some implementations, each time a user 1006, 1008 attempts to access a user account (e.g., to present credentials or manage a user account) from a client device 1002, 1004, the client device 1002, 1004 may transmit a request for authorization to the server 1030. If the client device 1002, 1004 has previously been associated with the user account, the client device 1002, 1004 may have a certificate stored in memory, which can be included with the request to the server 1030. The server 1030 then can verify that the client device 1002, 1004 was associated with the user account by confirming the validity of the certificate. For example, the server 1030 may confirm that information in the certificate (e.g., a certificate serial number and/or signature) matches information from a certificate previously issued by the server 1030 that is associated with the user's account. If the server 1030 verifies that the client device 1002, 1004 is associated with the requested user account, the server 1030 may grant access to the account, for example by transmitting a message to the client device 1002, 1004 including the requested information.

In some implementations, the server 1030 may monitor usage of each registered client device. For example, each time a user logs into the user's user account from a registered client device, the server 1030 may store an entry in a memory structure (e.g., a database or a flat file) storing details of what device was used, and where and when the user logged in (e.g., a device identifier, a user name, user account identifier, email address, location, date and/or time). In particular, when a client device 1002, 1004 submits a login request, the request may include a current location of the client device, for example, based on GPS coordinates, Wi-Fi access point triangulation data, cellular network triangulation data, or IP address information. The server 1030 may also store entries when a client device outputs a representation of a credential for validation (e.g., displays a badge), or signs a document using a credential. For example, when the credential management application on a client device 1002, 1004 outputs a representation for a credential or signs a document using a credential, the client device may transmit information to the server 1030 describing the use (e.g., a device identifier, a user name, user account identifier, the type of use, email address, location, date and/or time). Alternatively or in addition, when a credential is presented for validation, a processing system 1012 operated by the validation entity may transmit the usage information to the server 1030. The server 1030 may then store an entry including these details.

Additionally, the server 1030 may provide access to the account usage information. For example, when a user logged into a registered client device 1002, 1004 requests account usage information, the client device may request account usage information from the server 1030. The server 1030 retrieves the account usage information associated with the account (e.g., by querying a database or accessing a flat file) and then transmits the requested information back to the client device 1002, 1004. The client device 1002, 1004 can then display the account usage information on a user interface.

FIG. 10 illustrates an example in which the credentials correspond to employee badges for gaining entry into a place of business. Users 1006, 1008 are employees and, consequently, have received credentials related to the business. In addition, the client devices 1002, 1004 have already been registered with the user accounts of their respective users. Accordingly, the client devices 1002, 1004 have certificates stored in memory that allow credential management applications on the client devices 1002, 1004 to access credentials and account management features of the respective user accounts.

For example, the client device 1004 of user 1008 is executing an application that displays a user interface 1044 including a user wallet that allows the user 1006 to select from among various credentials. The client device 1004 of user 1008 is executing an application that displays a user interface such as an employee badge. The user interface may include a quick response (QR) code. User 1008, at the front of the entry line, has presented the QR code for validation to the validation entity 1010. The validation entity 1010 is a security guard responsible for permitting only authorized individuals to enter the place of business. The credential for accessing the place of business may be represented in a variety of different formats described below, and the validation entity 1010 may be able to validate representations of the credential in any of these different formats.

In some implementations, the client device 1002, 1004 may obtain the user's image from, for example, a memory of the client device 1002, 1004, or a server such as the server 1030. The client device 1002, 1004 may display this image before, after, and/or during presentation of the optical machine-readable representation for authentication of the user 1006, 1008.

After a user 1006, 1008 logs into a user account from the user's client device 1002, 1004 (e.g., by transmitting a request for access to the server 1030 that includes a certificate), the user 1006, 1008 may operate their client device 1002, 1004 to present representations of credentials for validation. For example, the user 1006, 1008 may input a command into the user's client device 1002, 1004 via a man-machine interface (e.g., a user interface on a presencesensitive display) to select a desired credential. The credential management application executing on the client device 1002, 1004 then generates and outputs the selected representation to a validation entity 1010 for validation.

The representation of a credential may take a variety of different forms. For example, the representation may be an alphanumeric code, a sound signal (e.g., an audible sound signal or an ultrasonic sound signal), an optical machine-readable representation (e.g., a barcode or a quick response (QR) code), a parametrically-generated graphical representation, an animated graphic representation, and/or a phrase, among others.

As referred to herein, an alphanumeric code may be a sequence of numbers and/or letters (e.g., 4 to 24 characters) that is associated with a credential and a user. In some instances, a given alphanumeric representation will only be valid for a certain time period. In operation, applications for credential validation execute on the client device 1002, 1004 and the processing system 1012. The server 1030 associates an alphanumeric code with a user 1006, 1008 and a credential, and distributes the alphanumeric code to the user's client device 1002, 1004. When the user 1006 presents the alphanumeric code to the validation entity 1010, the processing system 1012 can validate the alphanumeric code by communicating with the server 1030, and receiving a response indicating whether the presented alphanumeric code matches a valid alphanumeric code (e.g., an alphanumeric code that currently is associated with a user to whom a valid credential has been granted at the point in time the processing system 1012 communicates the alphanumeric code to the server 1030).

As referred to herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing credential identifiers and any other suitable data. In other implementations, the optical machine-readable representations may encode other identifiers that are linked to or otherwise associated with credential identifiers. As an example, credential identifiers for the users 1006, 1008 may be encoded using QR codes.

The client device 1002, 1004 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

When the client device 1002, 1004 displays an optical machine-readable representation, the validation entity 1010 can operate the processing system 1012 to scan the portion of the client device's display showing the representation and decode the representation to generate a set of alphanumeric characters that were encoded in the representation. In particular, the processing system 1012 may provide a user interface 1046 that includes a reticle 1048 defining a field of view from a camera operatively coupled to the processing system 1012. This reticle can be used by the validation entity 1010 to scan the optical machine-readable representation from the relevant portion of the client device's display.

The processing system 1012 may use any suitable mechanism to scan and decode the optical machine-readable representation. For example, the processing system 1012 may access a function or library routine that captures and decodes QR codes and/or barcodes using a camera operatively coupled to the processing system 1012. Suitable libraries may include, for example, RedLaser or Zxing.

The processing system 1012 can then validate the optical machine-readable representation by communicating data corresponding to the alphanumeric characters that were encoded in the representation to the server 1030. In response, the processing system 1012 receives a response indicating whether the presented optical machine-readable representation corresponds to a credential that currently is associated with a user to whom a valid credential has been granted at the point in time the processing system 1012 communicates the alphanumeric code to the server 1030.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

The sound signal may encode data including or representing credential identifiers and any other suitable data. In other implementations, the sound signal may encode other identifiers that are linked to or otherwise associated with credential identifiers. As an example, credential identifiers for the users 1006, 1008 may be encoded using sound signals. The client device may use any suitable technique for encoding the sound signal. For example, the client device may call a function or library routine that encodes data into sound signals such as the Zoosh SDK by Naratte, Inc. The client device 1002, 1004 can then output the sound signal from a speaker coupled to the client device for reception by the processing system 1012.

When the client device 1002, 1004 outputs a sound signal, the validation entity 1010 can operate the processing system 1012 to receive the sound signal at a speaker of the processing system and decode the sound signal to generate a set of alphanumeric characters that were encoded in the sound signal. The processing system 1012 may use any suitable mechanism to receive and decode the sound signal. The processing system 1012 can then validate the alphanumeric characters by communicating with the server 1030. In response, the processing system 1012 receives a response indicating whether the alphanumeric characters encoded in the sound signal correspond to a credential that is currently is associated with a user to whom a valid credential has been granted at the point in time the processing system 1012 communicates the alphanumeric characters to the server 1030.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In operation, the client device 1002, 1004 can obtain a credential identifier (e.g., from a memory of the client device) and a time (e.g., from a timing device of the client device), and generate a parametrically generated graphical representation for the credential using the credential identifier and time as seed values. Similarly, for validation, the processing system 1012 obtains a credential identifier and a time, and generates a parametrically generated graphical representation for the credential in the same manner. When the timing device at the processing system 1012 is synchronized with the timing devices at client device 1002, 1004, the parameters generated at the processing system 1012 should be identical (or nearly identical) to those of the client device 1002, 1004 when the credential identifiers are the same. The graphical representation generated by processing system 1012 should therefore match the graphical representations on the client device 1002, 1004 allowing the validation entity 1010 to visually validate the credential on the client device 1002, 1004.

As referred to herein, an animated graphical representation may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 1002, 1004 may access the stored graphical representations by way of index values, where an index value may correspond to a single representation. In operation, a client device 1002, 1004 obtains a credential identifier (e.g., from a memory of the client device) and a time (e.g., from a timing device of the client device), and selects an animated graphical representation for the credential by using the credential identifier and the time to generate an index value. Similarly, for validation, the processing system 1012 obtains a credential identifier and a time, and selects an animated graphical representation for the credential in the same manner. When the timing device at the processing system 1012 is synchronized with the timing device at client device 1002, 1004 the index values generated at the processing system 1012 should be substantially identical to those of the client device 1002, 1004 when the credential identifiers are the same. The graphical representation selected by processing system 1012 should therefore match (or nearly match) the graphical representations on the client devices 1002, 1004 allowing the validation entity 1010 to visually validate the credential on the client device 1002, 1004.

A phrase may be a sequence of two or more words selected from one or more dictionaries of words that need not form a grammatical construct. In operation, applications for credential validation executing on the client device 1002, 1004 and the processing system 1012 can access a common set of dictionaries for generating phrases, so that when the applications reference the same index values in the same dictionaries, at substantially the same time, they can select the same phrases. Thus, the processing system 1012 displays the same phrase as the client devices 1002, 1004 which enables the validation entity 1010 to validate the phrases at the client device 1002, 1004.

When the server 1030 receives a validation request message from the processing system 1012, it attempts to confirm that the presented representation of the credential is valid. In particular, the server 1030 may decode a set of alphanumeric characters and/or parse an alphanumeric code to obtain the credential identifier. The server 1030 can then access the corresponding credential using the credential identifier (e.g., from a database by querying using the credential identifier). Upon retrieving the credential, the server 1030 can determine whether the presented representation for the credential was valid by comparing data received in the validation request message with data associated with the retrieved credential. For example, the server 1030 may determine that a user identifier included in the validation request corresponds to an authorized user of the credential. In some implementations, the processing system 1012 may perform some or all of the validation of the representations for the credential.

In some implementations, if the credential representation is validated, the validation response may include an image, a name, and/or other data relating to the validated user including, e.g., a copy of the user's credential. The server 1030 may obtain information relating to the user (e.g., an image of the user) from the credential grantor as described above. For example, the processing system 1012 may display the user's name and the user's image. In some implementations, responsive to receiving a validation response from the server 1030, the processing system 1012 may obtain the user's image from, for example, a memory of the processing system 1012, the server 1030, a server made accessible by the credential grantor, or another server. The processing system 1012 may then output the user's image to a display operatively coupled to the processing system 1012.

Upon successful validation, the server 1030 sends the processing system 1012 a validation response indicating that the representation for the credential was valid (e.g., the set of alphanumeric characters decoded from the representation matches a set of alphanumeric characters generated at the server 1030). The processing system 1012 may then provide an indication to the validation entity 1010 that the representation presented by the user 1008 was valid. The validation entity 1010 may then permit the user 1008 to enter the place of business.

While shown in FIG. 10 as a person, the validation entity 1010 can be any agent capable of validating representations of credentials presented by users. As an example, the validation entity 1010 could be a software application executing on the processing system 1012 that processes a representation for a credential received from a client device 1002, 1004, decodes the representation to generate an alphanumeric set of characters, transmits the alphanumeric set of characters to the server 1030, and receives a response from the server 1030 indicating that the representation is valid. The software application could then control an automated gate to permit user 1008 to enter. The processing system 1012 can also be any suitable computer or set of computers capable of communicating with the server 1030 via network 1020, such as a mobile phone, smart phone, PDA, tablet computer, laptop or desktop computer, or other stationary or portable device, that includes one or more processors and non-transitory computer readable media.

Representations for multiple credentials may be displayed and/or presented concurrently. This may be implemented, for example, when credentials represent a hierarchy of access. As an example, if Mr. John Smith is an employee of MicroStrategy Incorporated and also is authorized to access the Executive Suite of MicroStrategy's headquarters, he may have two credentials, i.e., a first credential identifying Mr. Smith as an employee who is authorized to enter the headquarters, and a second authorizing Mr. Smith to access the Executive Suite. In such implementations, representations for the first credential and the second credential may both be presented at the same time or in series so that a validation entity can permit Mr. Smith access to the Executive Suite.

Figure 11:
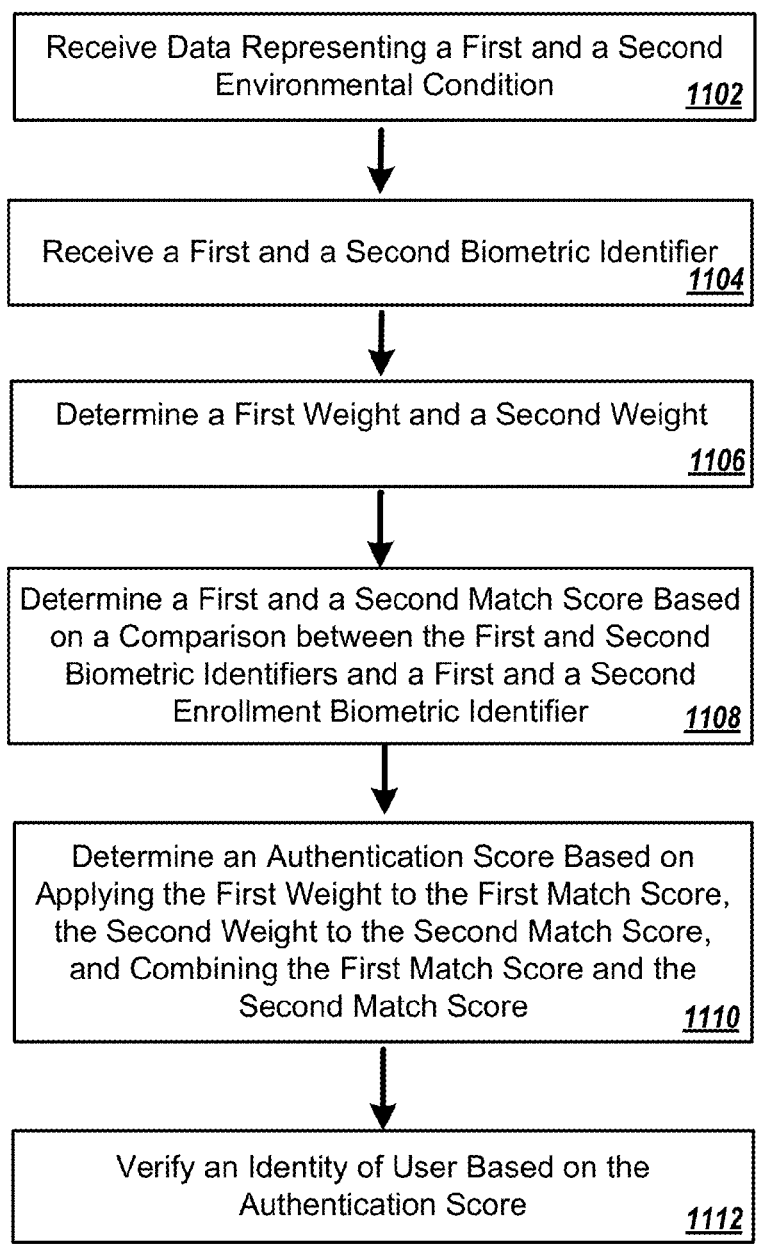
FIG. 11 is a flow chart of an example process for providing biometric verification of a user's identity in an uncontrolled environment.

FIG. 11 shows an example process 1100 for providing biometric verification of a user's identity in an uncontrolled environment. In step 1102, a server 1030 receives data representing a first and a second environmental condition from a client device 1002 (e.g. data representing lighting conditions and/or background noise).

In step 1104, the server 1030 receives a first and a second biometric identifier from the client device 1002 (e.g., an image of a face, an image of an eye (iris, perioccular vein, or retina), a voice recording, a fingerprint scan, etc.). The server 1030 may apply an appropriate feature extraction method to the first and second biometric identifier to extract features and convert the first and second identifiers into an appropriate data format for performing biometric identification (e.g., a feature vector or a voice print). Alternatively or in addition, the client device may perform an appropriate feature extraction method to the first and second biometric identifiers and may send the first and second biometric identifiers to the server in the appropriate data format for performing biometric identification (e.g., a feature vector or a voice print). Additionally, the quality of the first biometric identifier may be directly or indirectly affected by the first environmental condition (e.g., the first biometric identifier may be an image of a face and the data representing the first environmental condition may be a data representing the lighting conditions). Similarly, the quality of the second biometric identifier may be directly or indirectly affected by the second environmental condition (e.g., the second biometric identifier may be a voice recording and the data representing the second environmental condition may be a data representing background noise).

In step 1106, the server 1030 determines a first weight and a second weight based on the data representing first and second environmental conditions. For example, the server 1030 may use the data representing the first environmental condition to determine the first weight using a method such as classifier techniques using machine learning (ML), Neural Networks (NNs), statistical regression, or a hybrid method. Similarly, the server 1030 may use the data representing the second environmental condition to determine the second weight using a method such as classifier techniques using machine learning (ML), Neural Networks (NNs), statistical regression, or a hybrid method. Alternatively or in addition, the server 1030 may use both the data representing the first environmental condition and the data representing the second environmental condition to determine each of the first and second weights. For example, the server 1030 may use both data representing a lighting condition and data representing background noise to determine the first weight.

In step 1108, the server 1030 determines a first and a second match score based on a comparison between the first and second biometric identifiers and a first and a second enrollment biometric identifier, respectively. The server 1030 determines the first match score by comparing the first biometric identifier to the first enrollment biometric identifier. Likewise, the server 1030 determines the second match score by comparing the second biometric identifier to the second enrollment biometric identifier. For example, the first biometric identifier may be a feature vector generated from an image of a user's face captured on the user's client device 1002, and the first enrollment biometric may be a feature vector stored in the user's biometric profile and generated from an image of the user's face captured in a photo lab on the user's first day of work at a new business. The first match score indicates the extent to which the client device image of the user's face matches the stored enrollment image of the user's face.

In step 1110, the server 1030 determines an authentication score based on applying the first weight to the first match score, the second weight to the second match score, and combining the first match score and the second match score. The first and second match scores may be mathematically combined, for example, by techniques including weighted summation, weighted multiplication, minimum or maximum score, quality weighting, user weighting, and classifier techniques using machine language or neural network methods.

Finally, in step 1112, the server 1030 verifies an identity of a user based on the authentication score. For example, the server 1030 may compare the authentication score determined in step 1110 to a threshold value. If the authentication score exceeds the threshold value then the identity of the identity of the user has successfully been verified. Upon proper authentication, the user may be granted access to one or more user credentials associated with the user. For example, the user may be granted access to his/her credential management account. In some examples, one or more of the user's credentials may be provided for display to the user (e.g., on a client device) in response to the user's identity being verified.

In some implementations, the server 1030 may adjust the threshold value based on a risk metric. The risk metric may be determined by the server or received at the server from a user's client device 1002. For example, a risk metric may indicate that the user's is attempting to perform biometric identification under circumstances that are unusual for the particular user. Therefore, to provide additional security in the event that someone is attempting to hack the user's account or the user's client device has been lost or stolen, the server 1030 may increase the threshold value in proportion to one or more risk metrics. Risk metrics may include, for example, the location of a client device, time of day, day of the week, a user's motion profile (e.g., how a particular user carries/uses a smartphone), characteristics of a user's client device (e.g., number/type of applications on the device, photos stored the device, contacts in a user's contact list), and a user's normal login frequency.

In some implementations, the first biometric identifier may be of a different type than second biometric identifier. For example, the first biometric identifier may be facial recognition and the second biometric identifier may be voice recognition. Alternatively or in addition, the first biometric identifier may be of a same type as the second biometric identifier but may be acquired from a different sensor or from a different aspect. For example, the first and second biometric identifiers may both be facial biometric data; however, the first and second images of the user's face may be acquired from two different angles.

Additionally, process 1100 may be performed using any number of biometric identifiers and associated environmental conditions.

Figure 12:
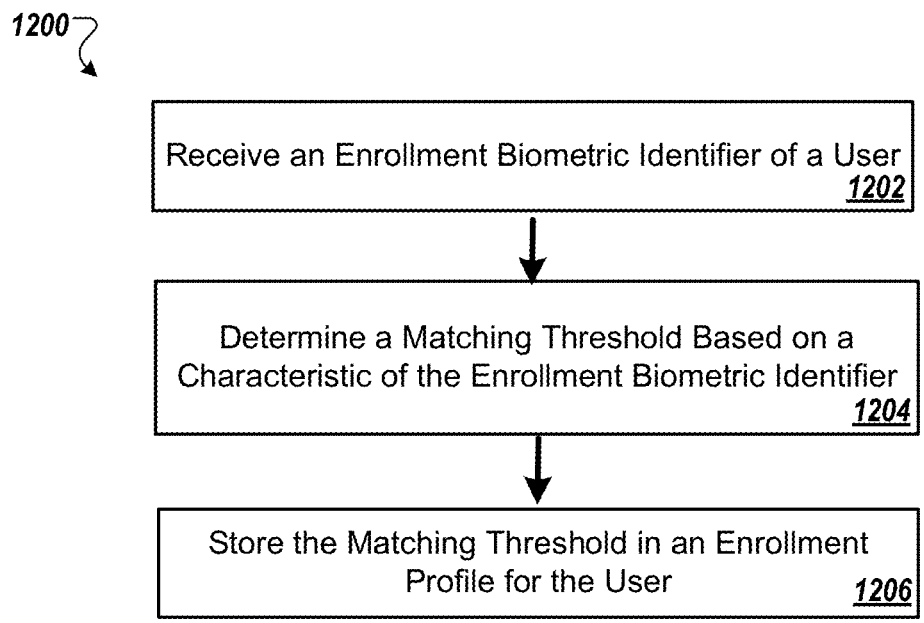
FIG. 12 is a flowchart of an example process for enrolling biometric verification data of a user.

FIG. 12 shows an example process 1200 for enrolling biometric verification data of a user. In step 1202, a server 1030 receives an enrollment biometric identifier of a user from a client device 1002 (e.g. an image of the user's face or eye, a recording of the user's voice, or a scan of the user's fingerprint).

In step 1204, the server 1030 determines a matching threshold based on a characteristic of the enrollment biometric identifier. A matching threshold may represent the ease or difficulty of identifying a particular user based on a particular biometric identifier. A matching threshold may be determined based on evaluating the distinctiveness of the enrollment biometric identifier. For example, the server 1030 may classify the enrollment biometric as either well behaved, difficult to recognize, or easily mimicked (e.g., the classifications may correspond to Doddington's sheep, goats, and lambs discussed above in conjunction with FIG. 9). A matching threshold may then be determined in accordance with the classification of the enrollment biometric identifier. A matching threshold for an enrollment biometric identifier classified as well behaved (e.g., a sheep) may be set to a default value. A matching threshold for an enrollment biometric identifier classified as difficult to recognize (e.g., a goat) may be set to a value below the default value. And, a matching threshold for an enrollment biometric identifier classified as easily mimicked (e.g., a lamb) may be set to a value above the default value. Alternatively or in addition, the matching threshold may be determined or modified based on historical match score data for the enrollment biometric identifier. For example, a match threshold may be determined or modified based on a match score distribution for the enrollment biometric identifier.

A matching threshold may be used, for example, during step 1108 of process 1100 above. For example, a matching score may be compared to a matching threshold to evaluate whether the matching score indicates a valid match or not (e.g., if performing decision level fusion as described above in conjunction with FIG. 9). Alternatively or in addition, a matching score may be adjusted up or down (similar to a weighting) based on a matching threshold in order to emphasize or deemphasize a match score for a particular biometric identifier (e.g., if performing score level fusion as described above in conjunction with FIG. 9).

And, in step 1206, the server 1030 stores the matching threshold in an enrollment profile for the user. The user's enrollment profile may include multiple enrollment biometric identifiers each enrollment biometric identifier associated with a unique matching threshold. The enrollment profile for the user may be stored at the server or at the client device.

In some implementations, the server 1030 also may receive from a client device 1002 data indicating an environmental condition. The environmental condition may be one which could affect the quality of the enrollment biometric identifier. The client device 1002 may measure the environmental condition before or after acquiring the biometric identifier. In some implementations, the server 1030 may use the data indicating the environmental condition to determine that the enrollment biometric has an accuracy metric below a required threshold. In such implementations, the server 1030 may send a request to the client device to prompt the user to provide another biometric identifier of the same type as the enrollment biometric identifier. For example, the data indicating the environmental condition may indicate that the lighting was poor when a user captured an enrollment image for a facial recognition biometric identifier on the user's client device 1002. In response to the server's 1030 request, the user's client device may prompt the user to move to a location with better light and retake the photograph on the client device.

While described as being performed at the server, the authentication of the biometric information and enrollment of biometric information may be performed partially or completely at the client device. For example, the client device may access biometric identification of the user and compare it with biometric information provided by the user.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A system comprising:
one or more processors; and

29 one or more data storage devices storing instructions that, when executed by the one or more processors, cause the one or more processors to perform operations comprising:
    receiving, from a computing device, a biometric identifier of a user;
    determining a match score based on a comparison of the biometric identifier to an enrollment biometric identifier associated with the user;
    receiving motion data indicating a manner in which the computing device is carried;
    determining, based on the motion data, that the biometric identifier has been received under conditions that do not conform to a routine associated with the user;
    in response to determining that the biometric identifier has been received under conditions that do not conform to the routine associated with the user, modifying match criteria to make verification of the identity of the user based on the biometric identifier more stringent; and
    verifying an identity of the user based on comparing the match score with a threshold match score using the modified criteria.

2. The system of claim 1, wherein the operations further comprise:
    receiving additional data indicating at least one of: a location of a computing device from which the biometric identifier was received, a time on which the biometric identifier was received, or data indicating a type of the computing device from which the biometric identifier was received; and
    determining, based on the additional data, that the biometric identifier has been received under conditions that do not conform to the routine associated with the user.

3. The system of claim 1, wherein modifying the match criteria to make verification of the identity of the user based on the biometric identifier more stringent comprises increasing a value of the threshold match score.

4. The system of claim 1, wherein modifying the match criteria to make verification of the identity of the user based on the biometric identifier more stringent comprises decreasing a value of the match score of the biometric identifier.

5. The system of claim 1, wherein the operations further comprise:
    receiving additional data indicating a location of a computing device from which the biometric identifier was received;
    determining that the location of the computing device is a location that is different from one or more other locations included in a routine associated with the user; and
    in response to determining that the location of the computing device is a location that is different from one or more other locations included in a routine associated with the user, further modifying the match criteria.

6. One or more non-transitory computer readable storage devices storing instructions that, when executed by one or more processors, cause the one or more processors to perform operations comprising:
    receiving, from a computing device, a biometric identifier of a user;
    determining a match score based on a comparison of the biometric identifier to an enrollment biometric identifier associated with the user;

30 receiving motion data indicating a manner in which the computing device is carried;
    determining, based on the motion data, that the biometric identifier has been received under conditions that do not conform to a routine associated with the user;
    in response to determining that the biometric identifier has been received under conditions that do not conform to the routine associated with the user, modifying match criteria to make verification of the identity of the user based on the biometric identifier more stringent; and
    verifying an identity of the user based on comparing the match score with a threshold match score using the modified criteria.

7. The medium of claim 6, wherein the operations further comprise:
    receiving additional data indicating at least one of: a location of a computing device from which the biometric identifier was received, a time on which the biometric identifier was received, or data indicating a type of the computing device from which the biometric identifier was received; and
    determining, based on the additional data, that the biometric identifier has been received under conditions that do not conform to the routine associated with the user.

8. The devices of claim 6, wherein modifying the match criteria to make verification of the identity of the user based on the biometric identifier more stringent comprises increasing a value of the threshold match score.

9. The medium of claim 6, wherein modifying the match criteria to make verification of the identity of the user based on the biometric identifier more stringent comprises decreasing a value of the match score of the biometric identifier.

10. The medium of claim 6, wherein the operations further comprise:
    receiving additional data indicating a location of a computing device from which the biometric identifier was received;
    determining that the location of the computing device is a location that is different from one or more other locations included in a routine associated with the user; and
    in response to determining that the location of the computing device is a location that is different from one or more other locations included in a routine associated with the user, further modifying the match criteria.

11. A computer-implemented method executed by one or more processors, the method comprising:
    receiving, from a computing device, a biometric identifier of a user;
    determining, by the one or more processors, a match score based on a comparison of the biometric identifier to an enrollment biometric identifier associated with the user;
    receiving, by the one or more processors, motion data indicating a manner in which the computing device is carried;
    determining, by the one or more processors and based on the motion data, that the biometric identifier has been received under conditions that do not conform to a routine associated with the user;
    in response to determining that the biometric identifier has been received under conditions that do not conform to a routine associated with the user, modifying, by the one or more processors, match criteria to make verification of the identity of the user based on the biometric identifier more stringent; and verifying, by the one or more processors, an identity of the user based on comparing the match score with a threshold match score using the modified criteria.

12. The method of claim 11, further comprising:
receiving additional data indicating at least one of: a location of a computing device from which the biometric identifier was received, a time on which the biometric identifier was received, or data indicating a type of the computing device from which the biometric identifier was received; and
determining, based on the additional data, that the biometric identifier has been received under conditions that do not conform to the routine associated with the user.

13. The method of claim 11, wherein modifying the match criteria to make verification of the identity of the user based on the biometric identifier more stringent comprises increasing a value of the threshold match score.

14. The method of claim 11, further comprising:
receiving additional data indicating a location of a computing device from which the biometric identifier was received;
determining that the location of the computing device is a location that is different from one or more other locations included in a routine associated with the user; and
in response to determining that the location of the computing device is a location that is different from one or more other locations included in a routine associated with the user, further modifying the match criteria.

15. The system of claim 1, wherein the operations further comprise:
receiving a use profile of the computing device that includes information related to applications stored on the computing device;
determining that the use profile of the computing device does not conform to a routine use profile associated with the user; and
in response to determining that the use profile of the computing device does not conform to a routine use profile associated with the user, further modifying the match criteria.

16. The medium of claim 6, wherein the operations further comprise:
receiving a use profile of the computing device that includes information related to applications stored on the computing device;
determining that the use profile of the computing device does not conform to a routine use profile associated with the user; and
in response to determining that the use profile of the computing device does not conform to a routine use profile associated with the user, further modifying the match criteria.

17. The method of claim 11, further comprising:
receiving a use profile of the computing device that includes information related to applications stored on the computing device;
determining that the use profile of the computing device does not conform to a routine use profile associated with the user; and
in response to determining that the use profile of the computing device does not conform to a routine use profile associated with the user, further modifying the match criteria.

18. The method of claim 11, wherein modifying the match criteria to make verification of the identity of the user based on the biometric identifier more stringent comprises decreasing a value of the match score of the biometric identifier.

* * * * *

UNITED STATES PATENT AND TRADEMARK OFFICE
CERTIFICATE OF CORRECTION

PATENT NO. : 9,742,764 B1  
APPLICATION NO. : 15/232350  
DATED : August 22, 2017  
INVENTOR(S) : Siamak Ziraknejad, Ren-Jay Huang and Burak Sahin It is certified that error appears in the above-identified patent and that said Letters Patent is hereby corrected as shown below:

In Claim 7, Column 30, Line 14, delete "medium" and insert --devices--.

In Claim 9, Column 30, Line 30, delete "medium" and insert --devices--.

In Claim 10, Column 30, Line 34, delete "medium" and insert --devices--.

In Claim 16, Column 32, Line 8, delete "medium" and insert --devices--.

Signed and Sealed this  
Twentieth Day of March, 2018

Andrei Iancu  
*Director of the United States Patent and Trademark Office*